Nov. 15, 1955

J. MORKOSKI 2,723,612

TWO-WAY DISK PLOW

Filed June 20, 1951

Inventor:
JAMES MORKOSKI
By Paul O. Pippel
Attorney

United States Patent Office 2,723,612
Patented Nov. 15, 1955

2,723,612

TWO-WAY DISK PLOW

James Morkoski, Memphis, Tenn., assignor to International Harvester Company, a corporation of New Jersey Application June 20, 1951, Serial No. 232,514

8 Claims. (Cl. 97—31)

This invention relates to agricultural implements and particularly to plows. More specifically the invention concerns a tractor mounted disk plow of the two-way or reversible type.

An object of the invention is the provision of an improved reversible disk plow adapted to be attached to a tractor to be supported thereon in transport and to be propelled thereby in operation.

A disk plow of the type with which this invention is particularly concerned comprises generally a frame extending longitudinally and attached to the rear of a tractor or the like and a gang of disks positioned diagonal to the direction of travel, the width of cut being determined in part by the spacing between the disks and in part by the angle which the disk assumes relative to the direction of travel. The gang of disks is reversed by swinging the gang laterally about a vertical pivot so that the disks are arranged on the opposite diagonal for plowing in a reverse direction. By the use of such a two-way or reversible disk plow, the tractor operator can reverse his direction of operation at each end of the field and still throw the dirt in the same direction. The mechanism by which the disk gang is reversed is the subject of a separate U. S. application, Serial No. 231,354, filed June 13, 1951, in the name of Marvin D. Jennings.

Another object of the present invention is to provide improved mechanism for supporting a disk plow gang upon a frame wherein means are provided for guiding the disk gang as it swings laterally from one operating position to the other.

Since the plane of each disk is not normal to the plane of the diagonally extending tool-carrier but at an obtuse angle thereto, the disks do not assume the correct cutting angle when the carrier swings laterally in response to reversal of the direction of travel. The disks must therefore be adjusted relative to the carrier to an angle corresponding to the angle they assumed when plowing in the opposite direction.

Another object of the invention, therefore, is the provision, in a reversible disk plow, of novel means for also adjusting the angle of the disk.

A further object of the invention is the provision, in a reversible disk plow, of mechanism incorporated in the gang shifting apparatus for adjusting the angle of the disk during the shifting of the gang from one of its positions to the other.

Another object of the invention is the provision of novel mechanism for reversing a two-way disk plow, which mechanism includes a lost-motion connection accommodating additional adjustment of the angle of the disks prior to the shifting of the disk frame or carrier.

Other objects and advantages of the invention will become clear from the following detailed description when read in conjunction with the accompanying drawings, wherein:

Figure 4 is a sectional elevation on a larger scale on the line 4—4 of Figure 1.

Figure 1:
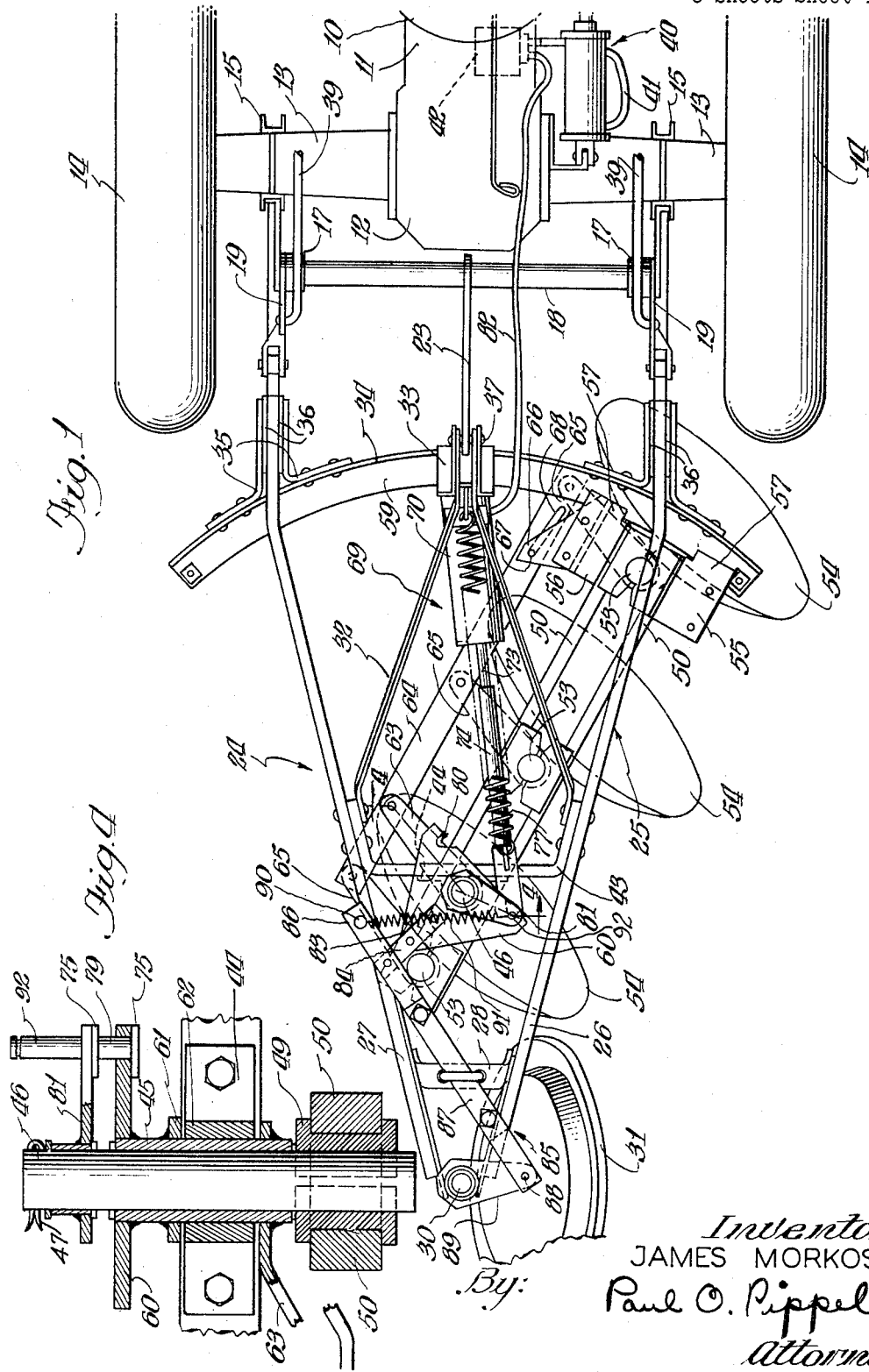
Figure 1 is a plan view of a two-way disk plow embodying the features of this invention and mounted upon the rear end of a tractor.
Figure 2:
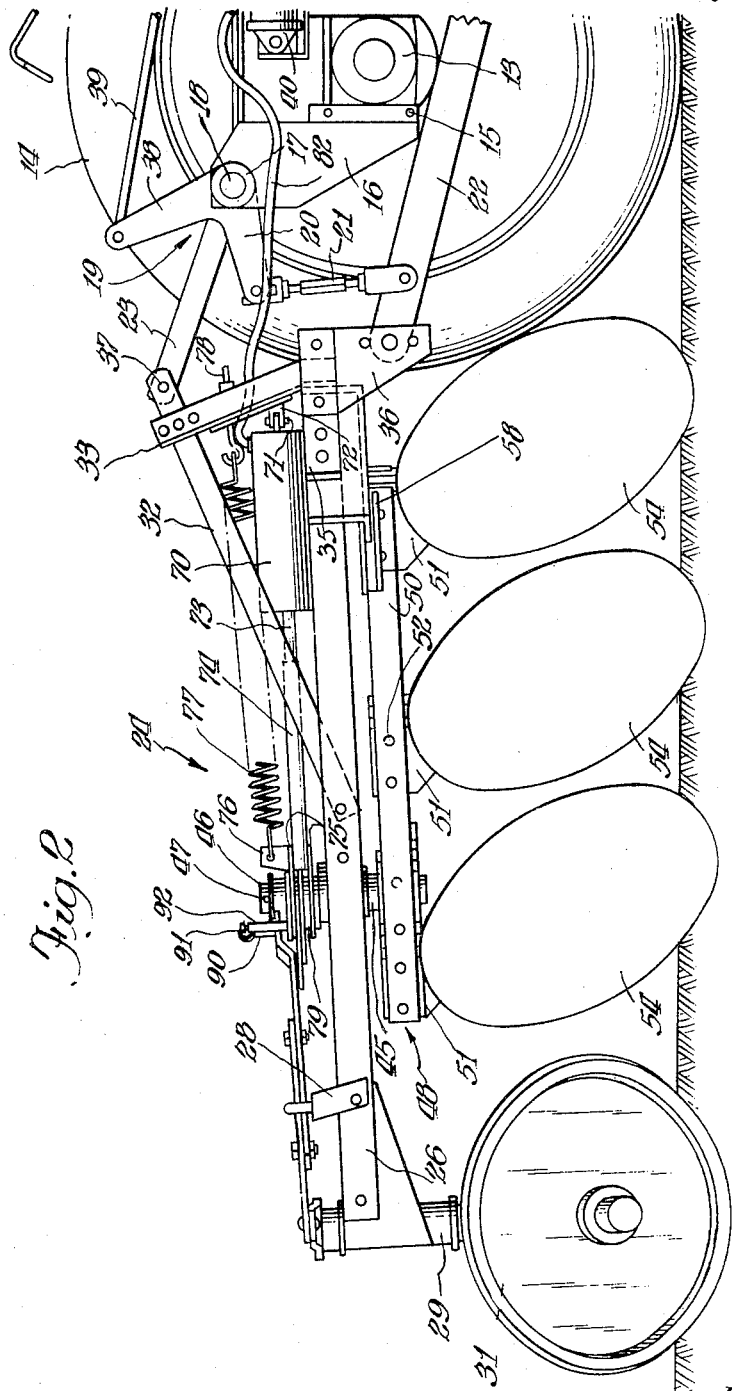
Figure 2 is a side elevation of the structure shown in Figure 1 with the disks in operating position.

Referring to the drawings, the numeral 10 designates the longitudinally extending body of a tractor having a power plant 11, a transmission housing 12, laterally extending axle housings 13, and rear drive wheels 14. Rear axle housings 13 have secured thereto laterally spaced clamps 15, each of which has mounted thereon a standard 16 provided with bearings 17 adapted to rotatably receive the ends of a transverse rock shaft 18 extending across the back of the tractor parallel to the rear axle housings. At each end of the shaft 18 is affixed a bell-crank 19, each of which has a rearwardly extending arm 20 connected by an adjustable link 21 to laterally spaced links 22 pivotally connected to the tractor by means, not shown, for vertical swinging movement thereof. Generally parallel to these links 22 and vertically spaced thereabove is another link 23 which is secured to the rock shaft 18. The links 22 and 23 function as the attaching mechanism by which the two-way disk plow, designated by the numeral 24 and embodying the features of this invention, is attached to the tractor to be propelled thereby over a field to be plowed and to be lifted thereon for transport.

The two-way plow of this invention comprises a longitudinally extending supporting frame 25 generally triangular in shape and formed of a pair of laterally spaced rearwardly converging frame bars 26 and 27, the rear ends of which are connected by a cross brace 28 and between said rear ends there is secured a vertically extending bearing 29 in which is rotatably mounted the vertical portion 30 of an axle which is bent downwardly and outwardly at its lower end to provide for the mounting thereon of a rear furrow wheel 31 upon which the rear end of the implement is supported. A pair of straps 32 are secured to the bars 26 and 27 and converge forwardly and upwardly and their forward ends are supported upon a standard 33 secured to and extending upwardly from an arcuately shaped angle bar 34 affixed to the forward ends of the bars 26 and 27 by straps 35. Also secured to the straps 35 at opposite sides of the plow frame are depending plates 36 to each of which is pivotally connected one of the links 22. The ends of straps 32 extending beyond the standard 33 carry a pivot pin 37 to which is pivotally connected the rear end of the upper link 23. The implement 24 may be vertically moved between operating and transport positions by rocking the shaft 18, and this is accomplished by the connection to arm 38 of bell crank 19 at each end of the rock shaft 18 of a lifting rod 39. Power is transmitted to the lifting rods 39 to move them forwardly and rearwardly for lifting the implement through suitable connecting mechanism, not shown, deriving power from a hydraulic ram 40 mounted upon the side of the tractor and connected by fluid hose 41 to a pump 42 or other source of fluid under pressure, indicated in Figure 1, deriving power from the tractor power plant.

Between the frame bars 26 and 27 there is provided intermediate their ends a transverse brace 43 to which is secured a clamp 44. Clamp 44 supports a vertically extending bearing 45 in which is rotatably received a pivot pin or spindle 46 secured against displacement by one or more pins 47.

An elongated tool carrying sub-frame 48 is affixed to the lower end of the pin 46 by a clamp 49. Sub-frame 48 extends diagonally with respect to a longitudinal center line through the main supporting frame 25 in operating position and comprises a pair of laterally spaced beams 50 secured to the clamp 49. The beams 50 are mounted near their rear ends upon the pivot pin 46 and support therebetween at spaced locations from front to rear a plurality of bearing blocks 51 affixed to the beams by bolts 52 and support for rotation vertically extending spindles 53, each of which carries at its lower end an earth penetrating disk 54.

Figure 3:
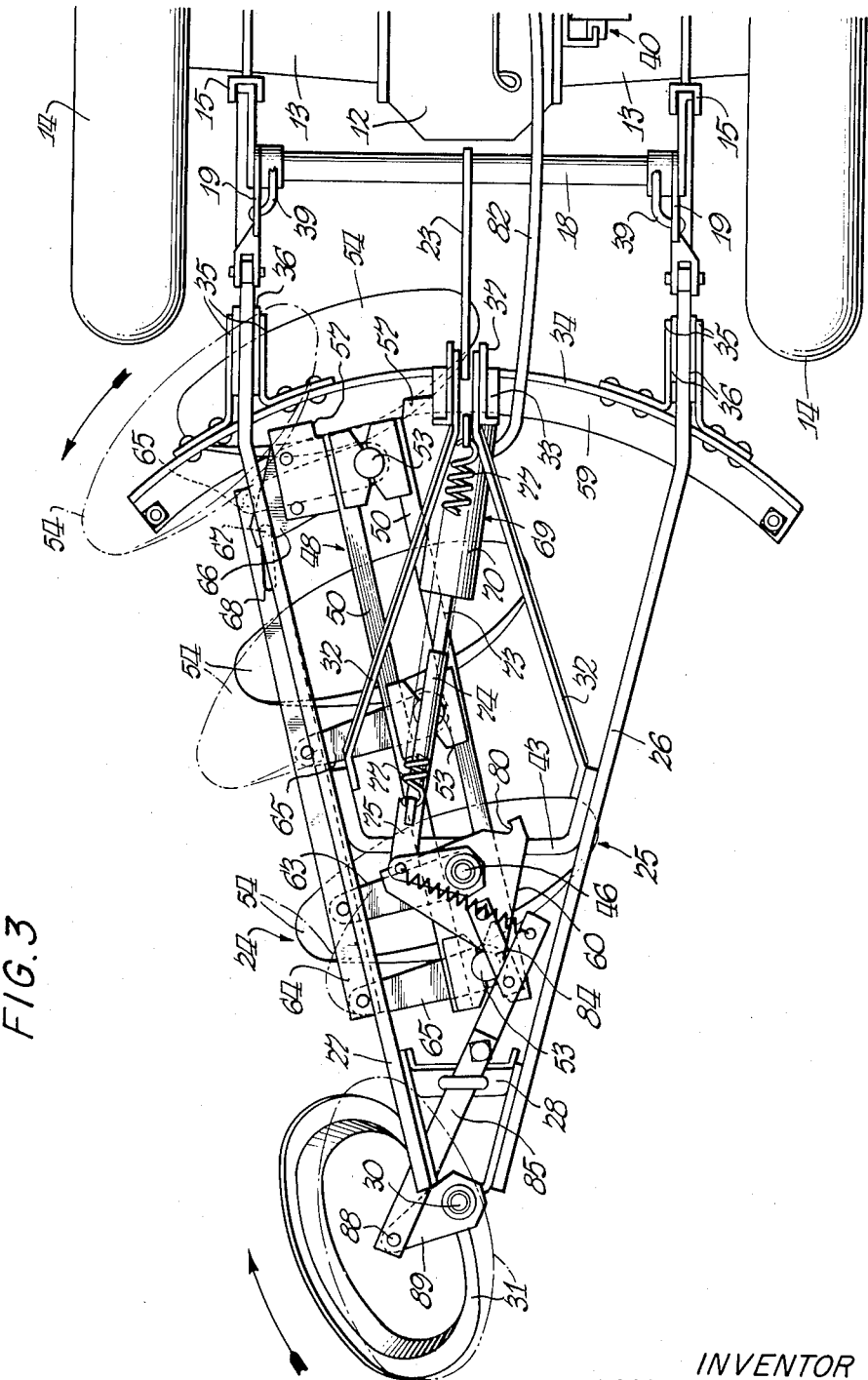
Figure 3 is a plan view showing the disk gang as it is being shifted to its alternative operating position.

To the forward end of the sub-frame and secured to and extending laterally from the beams 50 thereof are plates 55 and 56. Each of these plates has forwardly extending vertically spaced projections 57 and 58 which confine therebetween the rearwardly extending horizontal flange 59 of the arcuately shaped angle bar 34 connecting the forward ends of the frame bars 26 and 27. Flange 59 serves as a guide rail to prevent relative vertical movement of the front end of the sub-frame 48 and to accommodate sliding of the plates 55 and 56 on the flange 59 when the sub-frame is swung laterally from one operating position such as shown in Figure 1 to its other operating position for reversing the direction of plowing as indicated in Figure 3.

Lateral swinging of the sub-frame about its pivot on the spindle 46 is accomplished by mechanism including a triangular shifter plate 60 secured as by welding to the bearing 45 rotatably mounted on pin 46. Also secured as by welding to the bearing 45 is a spacing collar 61, and the bearing is rotatable in a bearing 62 carried by the clamp 44. Also secured as by welding to the bearing 45 below the bearing 62 is an arm 63 which extends laterally outwardly from the sub-frame 48 and is operatively connected to motion transmitting means including a bar 64 as clearly shown in Figures 1 and 3. Bar 64 extends parallel to the sub-frame 48 and laterally spaced therefrom and has pivotally connected thereto at spaced locations thereon a plurality of arms 65 which extend laterally from the respective disk spindles 53 and are fixed thereto. Thus it should be clear that upon rocking of the plate 60 about its pivot on the pin or spindle 46, motion is transmitted to the arm 63 which in turn moves the bar 64 longitudinally in a direction parallel to the sub-frame 48. Bar 64 therefore serves as a simple, unitary actuating member acting through the arms 65 to rotate all of the spindles 53 upon which the disks 54 are mounted, for a purpose which will hereinafter become clear.

In order to transmit motion from the plate 60 and arm 63 to swing the sub-frame 48 laterally about its pivot on the pivot pin 46, an extension 66 is provided for the plate 56 at the forward end of sub-frame 48 which is secured to the plate 56 by suitable bolts. A pin or bolt 67 projects downwardly from the extension 66 and is slidably received in a slot 68 formed in the forward end of the bar 64. Thus it should be clear that the bearing 45, with the plate 60 and the arm 63 affixed thereto, is rotatable on the pin 46 relative to the clamp 49 and beams 50, a distance determined by the extent of said slot. Upon rocking the plate 60 and transmitting motion to the arm 63, the bar 64 is moved, turning spindles 53 and therefore disks 54, until the pin 67 engages one end of slot 68 whereupon motion is transmitted to the sub-frame 48 to swing it laterally.

In Figure 1 it will be observed that the disks 54 occupy an angle greater than 90° with respect to the sub-frame 48. Therefore, upon reversing the direction of plowing and shifting the disk gang laterally to the other side of its supporting frame as indicated in Figure 3, additional adjustment must be made in the angle of the disks 54 with respect to their supporting frame. As pointed out before, this additional motion is supplied by the rotation imparted to spindles 53 through arms 65 and the bar 64. In Figure 3 the disk gang has not reached the limit of its lateral shifting but this is indicated by the dotted lines, and the disks have already been rotated until they again occupy an oblique angle with respect to the tool carrier.

The rocking of shifter plate 60 to reverse the position of the disk gang with respect to its supporting frame is supplied by force exerting means including a ram unit 69. Ram unit 69 comprises a cylinder 70 pivotally mounted upon a pivot pin 71 carried by a clevis 72 affixed to the standard 33 centrally of the main supporting frame 25 for lateral swinging movement of the cylinder. Slidably receivable in the cylinder for extension and retraction with respect thereto is a piston rod 73 which in turn is slidably receivable in a sleeve 74 against the end of which the rod 73 is adapted to abut in its extended position. Sleeve 74 has affixed as by welding to the rear end thereof vertically spaced generally horizontal plates 75 to the upper of which is welded a vertically extending lug 76. Lug 76 serves as an anchor for one end of a spring 77, the other end of which is connected to an eyebolt 78 adjustably carried by the standard 33, the function of which will hereinafter become clear.

Between the ends of the plates 75 there is mounted a pin 79 which is arranged to engage laterally projecting portions of the shifter plate 60 for the purpose of rocking the latter. Shifter plate 60 is rocked in opposite directions by engagement of the pin 79 with the plate at opposite sides of the pin 46 to alternately swing the disk gang 48 from one operating position to the other. Rocking of the shifter plate 60 is accomplished by extension of the piston rod 73 in the cylinder 70, the rod acting through the sleeve 74 and pin 79 to engage and rock the shifter plate. The shifter plate 60, as pointed out before, has portions extending laterally from opposite sides of its pivot on the spindle 46, and these laterally extending portions function as lever arms for transmitting motion through the shifter plate to shift the disk gang. Recesses or notches 80 are provided in the shifter plate along the forward edge thereof on opposite sides of the spindle 46 for reception of the pin 79 to provide a positive engagement therewith for rocking of the shifter plate in response to actuation of the cylinder.

The ends of the plates 75 are also pivotally connected by pin 79 to the end of an arm 81 which is mounted upon the spindle 46 for rotation relative thereto. The ram unit 69 is of the single acting one-way type and is supplied with fluid under pressure through a hose 82 connected to a source of fluid pressure such as the pump 42 indicated in dotted lines in Figure 1. Fluid under pressure is supplied from the pump 42 to the cylinder 70 to extend the piston rod and exert force through the sleeve 74 to rock the shifter plate 60. Upon the release of the fluid from the cylinder the piston 73 is retracted into the cylinder 70 and the sleeve 74 therewith, with the assistance of the spring 77. Upon collapse of the ram unit, the arm 81, the sleeve 74 and rod 73, and the pivot pin 71 of the cylinder 70 assume a position in substantial alignment between the notches 80 of the shifter plate. In this position the ram unit is ineffective to place the pin 79 in either of the recesses 80 of the shifter plate for rocking the latter. Therefore means are provided for moving the pivotal connection of arm 81 with plates 75 over-center with respect to the pivot pin 46 and the connection of the cylinder to the frame. This mechanism is now to be described.

Secured to the apex 83 of the triangular shifter plate 60 is a strap 84 to which a link 85 is pivotally connected intermediate its ends. Link 85 has a portion 86 extending forwardly from the strap 84 and a portion 87 extending rearwardly therefrom for pivotal connection at its rear end to a pin 88 carried at the end of an arm 89 affixed to the upper end of the axle 30. It may be observed that upon rocking of the arm 89 the furrow wheel 31 moves in an arc from the position of Figure 1 to the position of Figure 3 in which it is shown that the furrow wheel 31 is moving from a position on one side of the main supporting plow frame to the other side thereof when the direction of plowing is reversed. The fully reversed position of the furrow wheel is indicated in dotted lines in Figure 3. Motion is thus transmitted through the shifter plate 60 and the link 85 to swing the furrow wheel 31 from one position to another, and this is accomplished simultaneously with swinging of the disk gang from one position to another.

Upon the end 86 of link 85 and extending upwardly therefrom is a post 90 to which is anchored one end of a spring 91, the other end of which is anchored to a post 92 secured to and extending upwardly from the arm 81 mounted on spindle 46. Spring 91 moves from the position shown in Figure 1 to the position shown in Figure 3 upon reversing the direction of operation of the plow, and functions in the manner shown to bias or urge the pivotal connection of arm 81 with sleeve 74 toward the other notch 80 in the shifter plate so that upon the subsequent extension stroke of the ram unit the plate will be rocked in the direction to reverse the operation of the plow. In Figure 3 the pin 79 has already engaged the notch 80 in the shifter plate to move the disk gang into the position shown. Upon completion of this movement of the disk gang into operating position the fluid is released by the operator from the cylinder 70 and the spring 74 again acts to return the arm 81 and sleeve 74 into alignment. The spring 91 then assumes the position for biasing the pivot pin 79 off-center in the opposite direction in preparation for a subsequent reversal of the direction of plowing and reversal of the position of the disk gang.

The hydraulic power transmission mechanism deriving power from the tractor and including the ram units 40 and 69 and the pump 42 preferably also includes the use of a suitable valve system of the delay-type for discharging fluid under pressure from the pump to the ram units. This delayed valve operation may be of the type described, for example, in Lindgren et al. Patent 2,213,401. In such an arrangement fluid under pressure from the pump is first directed to the ram unit 40 for the purpose of raising the implement into transport position upon the tractor. Upon completion of this lifting the valve controlling the flow of fluid under pressure to ram unit 69 automatically opens and the ram unit 69 functions to reverse the position of the gang of disks for plowing in the opposite direction while the implement is in an inoperative position so that upon turning of the tractor at the end of the field, the implement will be in position for the return trip.

It is believed that the two-way disk plow of this invention and described herein will be clearly understood from the foregoing description. It should be understood, however, that the invention has been described only in its preferred embodiment and that modifications may be made therein without departing from the spirit of the invention or the scope of the appended claims.

What is claimed is:

1. In a reversible disk plow or the like having a main frame and a vertical pivot pin thereon, a diagonally arranged sub-frame mounted on said pivot pin for lateral swinging relative to the main frame from one operating position to the other, a plurality of vertical disk-carrying spindles rotatably mounted on the sub-frame at spaced locations thereon, laterally extending arms secured to said spindles, a bar generally parallel to the sub-frame to which each of said arms is pivotally connected, another arm secured to said pivot pin and pivotally connected at its end to said bar and adapted, upon rotation of the pivot pin, to move said bar and rotate said spindles, power operated means on the plow operatively connected to said pivot pin arm to rotate the pin, and a connection between said bar and said sub-frame operative upon rotation of said pivot pin and movement of said bar to also swing the sub-frame laterally, said bar having an elongated slot formed therein and said sub-frame carrying a projection received in said slot and constituting the aforesaid connection, said connection being operative upon engagement of the projection with an end of the slot to swing the sub-frame laterally during movement of said bar.

2. In a reversible disk plow or the like having a main frame and a diagonally arranged sub-frame mounted on the main frame for lateral swinging relative thereto from one operating position to the other, a plurality of vertical disk-carrying spindles rotatably mounted on the sub-frame at spaced locations thereon, laterally extending arms secured to said spindles, a bar to which each of said arms is pivotally connected whereby, upon shifting of said bar, said spindles are rotated simultaneously, power transmission means carried on the main frame and operatively connected to said bar for rotating the spindles relative to the sub-frame, and a connection of the bar to the sub-frame operative after limited independent movement of said bar to engage and swing the sub-frame laterally.

3. In a reversible disk plow or the like having a main frame and a diagonally arranged sub-frame mounted on the main frame for lateral swinging relative thereto from one operating position to the other, a plurality of vertical disk-carrying spindles rotatably mounted on the sub-frame at spaced locations thereon, laterally extending arms secured to said spindles, a bar to which each of said arms is pivotally connected whereby, upon shifting of said bar, said spindles are rotated and said sub-frame is swung simultaneously, power transmission means carried on the main frame and operatively connected to said bar to shift the same for rotating the spindles relative to the sub-frame, and a bolt and slot connection of the bar to the sub-frame accommodating limited movement of the bar relative to the sub-frame to rotate the spindles about their axes before movement is imparted to the sub-frame to swing it laterally.

4. In a reversible disk plow or the like having a main frame and a tool-carrying sub-frame mounted thereon for lateral swinging of one end thereof to opposite sides of a longitudinal center line through the main frame from one operating position to the other, a rockable member mounted on the main frame for rocking movement on a vertical axis, a plurality of vertical disk-carrying spindles rotatably mounted on the sub-frame at spaced locations thereon, arms secured to said spindles and extending laterally therefrom, a bar member connecting said arms and movable in a horizontal plane to rock said spindles and swing said sub-frame, an operating connection between said rockable member and said bar for moving the latter in response to rocking of the rockable member, and a bolt and slot connection providing lost motion between said bar and said sub-frame, whereby motion imparted to said bar member is successively imparted to said arms to rock the spindles and to the sub-frame to swing it laterally.

5. In a reversible disk plow or the like having a main frame and a tool-carrying sub-frame mounted thereon for laterally swinging of one end thereof to opposite sides of a longitudinal center line through the main frame from one operating position to the other, a rockable member mounted on the main frame for rocking movement on a vertical axis, a plurality of vertical disk-carrying spindles rotatably mounted on the sub-frame at spaced locations thereon, means for transmitting motion from the rockable member to the spindles to rock the latter and swing the sub-frame, said means including a horizontal bar member, a plurality of arms pivotally attached to and extending laterally from said bar and secured to the respective spindles to rock the latter in response to movement of the bar, means pivotally connecting the rockable member to said bar, and a connection between said motion transmitting means and said sub-frame providing for limited movement of the motion transmitting means and rocking of the spindles before motion is imparted to the sub-frame.

6. In a reversible disk plow or the like having a main frame and a tool-carrying sub-frame mounted thereon for lateral swinging of one end thereof to opposite sides of a longitudinal center line through the main frame from one operating position to the other, a rockable member mounted on the main frame for rocking movement on a vertical axis, a plurality of vertical disk-carrying spindles rotatably mounted on the sub-frame at spaced locations thereon, means for transmitting motion from the rockable member to the spindles to rock the latter and swing the sub-frame, said means including an actuating member, linkage connecting said actuating member to each of said spindles for rocking the latter about their axes upon operation of the actuating member, an operating connection between said rockable member and said actuating member, and a connection between said actuating member and said sub-frame accommodating limited movement of the actuating member and rocking of the spindles before motion is imparted to the sub-frame to swing it laterally.

7. In a reversible disk plow or the like having a main frame and a tool-carrying sub-frame mounted thereon for lateral swinging of one end thereof to opposite sides of a longitudinal center line through the main frame from one operating position to the other, a rockable member mounted on the main frame for rocking movement on a vertical axis, a plurality of vertical disk-carrying spindles rotatably mounted on the sub-frame at spaced locations thereon, means for transmitting motion from the rockable member to the spindles to rock the latter and swing the sub-frame, said means including an actuating member, linkage connecting said actuating member to each of said spindles for rocking the latter about their axes upon operation of the actuating member, an operating connection between said rockable member and said actuating member, and a lost motion connection including relatively slidable parts between said actuating member and said sub-frame accommodating limited movement of the actuating member and rocking of the spindles relative to the sub-frame before motion is imparted to the latter to swing it laterally.

8. In a reversible disk plow or the like having a main frame and a tool-carrying sub-frame mounted thereon for lateral swinging of one end thereof to opposite sides of a longitudinal center line through the main frame from one operating position to the other, a rockable member mounted on the main frame for rocking movement on a vertical axis, a plurality of vertical disk-carrying spindles rotatably mounted on the sub-frame at spaced locations thereon, means for transmitting motion from the rockable member to the spindles to rock the latter and swing the sub-frame, said means including an actuating member, linkage connecting said actuating member to each of said spindles for rocking the latter about their axes upon operation of the actuating member, an operating connection between said rockable member and said actuating member, and a lost motion connection including relatively slidable parts between said actuating member and said sub-frame accommodating limited movement of the actuating member and rocking of the spindles relative to the sub-frame before motion is imparted to the latter to swing it laterally, said lost motion connection comprising a bolt carried by the sub-frame and said actuating member having an elongated slot formed therein slidably receiving said bolt.

References Cited in the file of this patent

UNITED STATES PATENTS

| | | |
|---|---|---|
| 833,841 | Maiers | Oct. 23, 1906 |
| 1,635,019 | Walton | July 25, 1927 |
| 2,041,216 | Sjogren | May 19, 1936 |
| 2,163,832 | Coviello | June 27, 1939 |

FOREIGN PATENTS

| | | |
|---|---|---|
| 1,265 | Great Britain | Oct. 9, 1874 |